United States Patent [19]

Nagashima et al.

[11] Patent Number: 4,905,424
[45] Date of Patent: Mar. 6, 1990

[54] ROTARY TOOL COVER

[75] Inventors: Akira Nagashima, Kawasaki; Fujio Sasaki, Mitaka, both of Japan

[73] Assignee: Kioritz Corporation, Tokyo, Japan

[21] Appl. No.: 262,147

[22] Filed: Oct. 21, 1988

Related U.S. Application Data

[63] Continuation of Ser. No. 110,468, Oct. 20, 1987, abandoned.

[30] Foreign Application Priority Data

Oct. 22, 1986 [JP] Japan .............. 61-161755[U]

[51] Int. Cl.⁴ ............................................. B25B 55/04
[52] U.S. Cl. ........................................ 51/269; 51/268; 51/272
[58] Field of Search ................... 51/268, 269, 270; 30/370

[56] References Cited

U.S. PATENT DOCUMENTS

| | | | |
|---|---|---|---|
| 3,382,578 | 5/1968 | Dobbertin | 51/268 |
| 3,849,088 | 11/1974 | Johannson | 51/269 |
| 4,218,853 | 8/1980 | Willoughby et al. | 51/269 |

FOREIGN PATENT DOCUMENTS

| | | | |
|---|---|---|---|
| 940226 | 10/1963 | United Kingdom | 51/268 |
| 2118465 | 11/1983 | United Kingdom | 51/268 |

Primary Examiner—Frederick R. Schmidt
Assistant Examiner—Maurina Rachuba
Attorney, Agent, or Firm—Browdy & Neimark

[57] ABSTRACT

A rotary-tool cover having two sides plates with inwardly bent arcuate outer flanges, the side plates being connected after the bent outer flanges have been overlapped each other.

2 Claims, 5 Drawing Sheets

ROTARY TOOL COVER

This application is a continuation of application Ser. No. 110,468, filed 10/20/87, now abandoned.

FIELD OF THE INVENTION

This invention relates to a cover for a rotary tool such as a grind stone or cutter in the form of a disk for use in a hand grinder or engine-power cutter.

DESCRIPTION OF THE PRIOR ART

A machine, such as a grinder or engine-power cutter, which is used to grind or cut a comparatively hard material by rotating a rotary tool such as a disk-like grind stone or cutter, is designed to cover the grind stone or cutter with a semicircular cover member so as to prevent the operator from touching the grind stone or cutter and prevent chips formed by grinding or cutting or broken pieces of the cutter from flying to the operator.

Usually, this type of cover is formed in such a manner that two side plates of the cover with integrally formed flange portions which project outward in the radial direction at the outer peripheries of the plates are formed by press working from a sheet of material, these two side plates are made to abut against each other at the flange portions, the two side plates are connected by, for example, welding the abutting portions, and reinforcement lining members in the form of bands are attached to the inner peripheral surfaces of the outer peripheral portions of the connected side plates.

In a conventional cover formed in this manner, the structural strength of the outer peripheral portions of the side plates is not adequate due to the flange abutting connection, thereby necessitating the provision of lining members for reinforcing the peripheral portions. Therefore, labor and cost needed to manufacture this type of cover are high.

SUMMARY OF THE INVENTION

It is therefore an object of the present invention to provide a rotary-tool cover which is free of the above-described defects of the conventional rotary-tool cover and which has a simple form which enables the tool or machine to be handled easily.

To this end, the present invention provides a rotary-tool cover formed of two side plates and having a construction in which the side plates are connected after inwardly bent arcuate outer flanges of the side plates have been overlapped with each other. In this construction, the outer peripheral portion of the cover has a sufficient strength since the outer flanges of the side plates are connected to each other while being overlapped.

The present invention thus ensures a sufficient strength of the outer peripheral portion of the cover by overlapping the outer flanges of the two side plates which constitute the cover. The present invention eliminates the need for the provision of any separate lining member for reinforcing the cover, enabling the cover to have a simple construction and to be manufactured at a low cost.

DESCRIPTION OF THE PREFERRED EMBODIMENT

Figure 1:
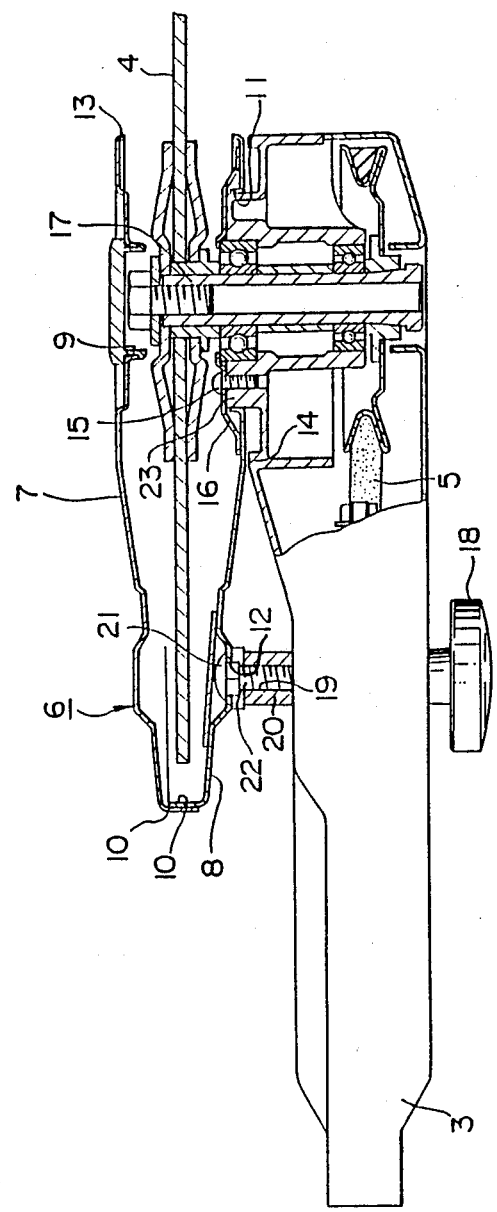
FIG. 1 is a horizontal cross-sectional view of essential portions of a hand engine-power cutter to which a cover which represents an embodiment of the present invention is attached.

The present invention will be described below with respect a preferred embodiment thereof in conjunction with the accompanying drawings.

The embodiment shown in the drawing exemplifies the application of the present invention to an hand engine-power cutter. This engine-power cutter has a main body 1, an internal combustion engine 2 mounted as a motor on the main body 1, an arm 3 whose rear end is connected to a side portion of the main body 1 and which projects in front of the main body 1, a cutter 4 in the form of a disk rotatably attached to the top of the arm 3, and a power-transmitting belt 5 which is a driving member stretched between the internal combustion engine 2 and the cutter 4 and which transmits rotational driving force from the internal combustion engine 2 to the cutter 4.

The cutter 4 is covered with a semicircular cover 6, a part of the cutter 4 being partially exposed to the outside. The cover 6 is constituted by two side plates 7 and 8. The side plates 7 and 8 are formed by press working using the same dies. The outer side plate 7, which is formed first, has a small-diameter hole 9 formed at the center of a circle which defines a semi-circular configuration of the side plate 7, and an arcuate outer flange 10 formed at the outer periphery of the side plate 7 by being bent to one side thereof. It is preferable to bisect the length of the outer periphery of the outer flange 10 and reduce the radius of one of the sectors thereby formed by the thickness of the side plate. This enables the operation of overlapping the outer flanges of the two side plates to be facilitated. The inner side plate 8 is formed by press working so as to have the same shape as that of the outer side plate 7. A large-diameter hole 11 whose diameter is larger than that of the small-diameter hole 9 of the outer side plate 7 is thereafter formed in the inner side plate 8 by, for example, punching at the center of the semi-circle, and a concentric arcuate channel with an aperture 12 is formed in a position near an outer flange 10. The outer flanges 10 of the side plates 7 and 8 are overlapped so that the bisected peripheries are correspondingly combined with each other, and the outer flanges 10 thereby overlapped are welded to be connected to each other. The cover 6 is thus completely closed at its arcuate outer flange portion which has a thickness twice as large as that of each side plate, and an opening 13 which opens toward the outside is formed in a position corresponding to the chord of the semi-circle.

The cover 6 is rotatably pinched between a connecting portion 14 formed at the side of a head portion of the arm 3 and a pressing plate 16 fixed to the side of this arm head portion by means of a screw 15, while a peripheral portion of the large-diameter hole 11 of the inner side plate 8 is fitted around a flange 23 which is formed on the arm head portion. The cover 6 is thus disposed coaxially with a rotary shaft 17 of the cutter 4.

Figure 2:
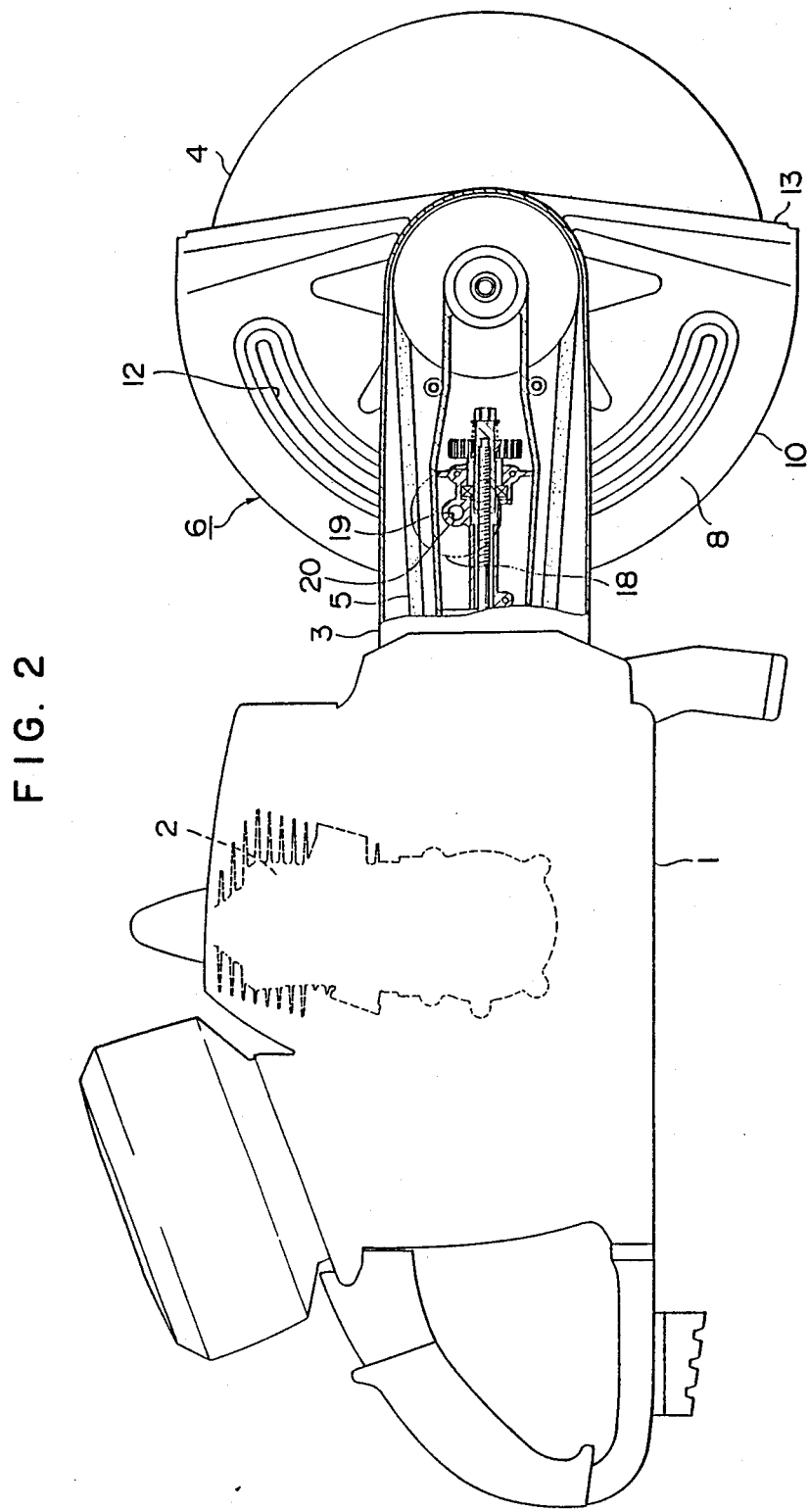
FIG. 2 is a partially sectional side view of the engine-power cutter shown in FIG. 1.

A nut 18 which is integrally provided with a knob portion is screwed around a screw 22 which passes through a hole 19 in a boss portion 20 formed on the arm 3, and a head 21 of the screw 22 is engaged with a hole 12 of the inner side cover 8. This construction enables the cover 6 to be turned clockwise or counterclockwise from the position indicated in FIG. 2 by rotating the knob portion of the nut 18 and releasing the fastened state of the inner side plate 8 and the boss portion 20. It is thereby possible to downwardly or upwardly move the position at which the cutter 4 is exposed. The cover 6 can be retained at a desired position relative to the arm 3 by fastening the nut 18.

Figure 3:
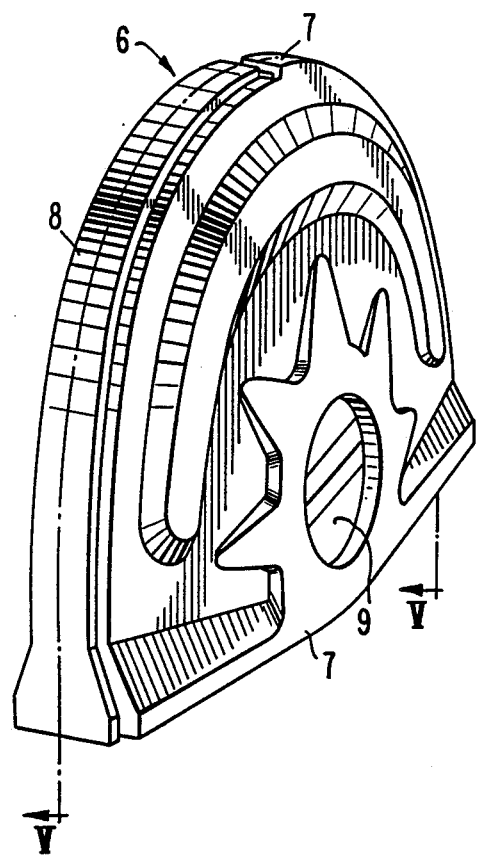
FIG. 3 is a plan view of the half-engaged cover according to the present invention.

FIG. 3 is a plan view of the half-engaged cover according to the present invention.

Figure 4:
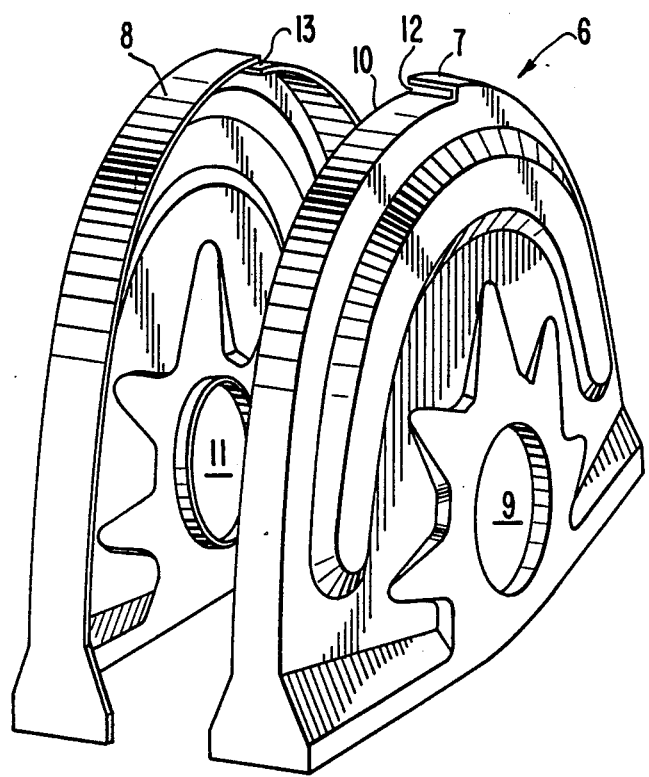
FIG. 4 is a view of the cover with its two halfs separated from one another.

FIG. 4 is a view of the cover with its two halfs separated from one another.

Figure 5:
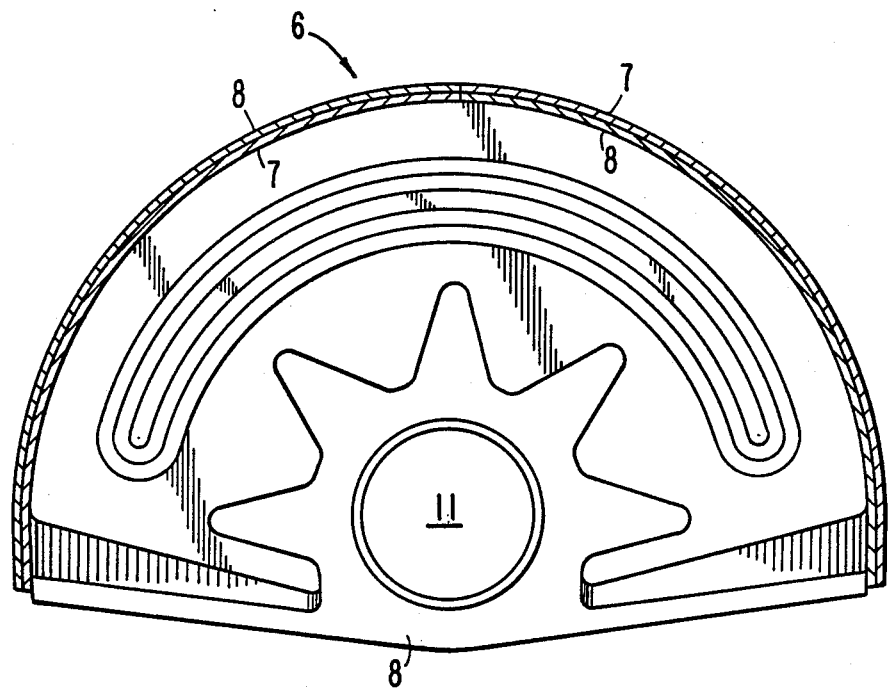
FIG. 5 is a cross-sectional view of the cover along the line V—V of FIG. 3.

FIG. 5 is a cross-sectional view of the engaged cover shown along the line V in FIG. 3.

What is claimed is:

1. A rotary-tool cover comprising two side plates each having inwardly bent arcuate outer flanges, said flanges each having a width, said width being perpendicular to a radius extending from the center of the cover to the flange said side plates being connected after said bent outer flanges have been overlapped with each other, wherein a circumferential surface of the outer periphery of each of said bent outer flanges is bisected along said width so as to form two sectors and reduce the radius of one of the sectors by a thickness of said side plate, wherein the reduced sectors of each plate are overlapped by the non-reduced sectors, providing the cover with an outer flange portion with a thickness twice as large as that of each side plate, wherein the outer flanges thereby overlapped are welded together and the two side plates have the substantially same shape and size formed by press working using the same dies.

2. A rotary-tool cover as claimed in claim 1, wherein said two-side plates are identical with one another.

* * * * *